UNITED STATES PATENT OFFICE 2,212,446

PROCESS OF CALCINING COMMINUTED LIMESTONE

Walter H. MacIntire, Knoxville, Tenn., assignor to American Zinc, Lead & Smelting Company, St. Louis, Mo., a corporation of Maine No Drawing. Application February 23, 1939, Serial No. 258,058

1 Claim. (Cl. 263—53)

This invention relates to a process for converting limestone or equivalent materials into burnt lime, and has for its object to effect a complete conversion of limestone into its components of burnt lime (CaO) and carbon dioxide ($CO_2$) at a much lower temperature and greatly reduced cost than those heretofore prevailing; and furthermore to utilize large quantities of finely ground limestone occurring as a by-product in various commercial operations.

The burning of large lumps of limestone, in shaft kilns, and the rotary-kiln calcination of smaller particles are both well known procedures, whereby the limestone is subjected to direct fire. So far as I have been able to determine, however, there has been developed only one procedure (U. S. Patent No. 1,923,084, August, 1933) whereby comminuted limestone can be effectively calcined. That patent prescribes facilities for the pre-heating and calcining by indirect application of heat at about 2100° F. (1149° C.). As stated in that patent, the absence of a feasible commercial operation has precluded the utilization of large quantities of finely ground by-products of limestone, and limestone plants are in the habit of discarding finely comminuted limestone as useless for practical purposes. The critical temperature for the dissociation of limestone into its components, burnt lime (CaO) and carbon dioxide ($CO_2$), under ideal conditions, is universally recognized in the art as 910° C. or higher. In practice, however, the necessity for forcing sufficient heat into the heart of the lumps of limestone to assure complete calcination throughout the lumps calls for an imposed kiln temperature of 1050 to 1100° C. or more. By means of the present process, however, I am able to effect dissociation at a temperature of approximately 700° C., which is more than 210° C. lower than the now recognized critical temperature required to effect such dissociation and about 400° C. lower than the temperature imposed in the art, with the result that there is secured a substantial saving in fuel consumption and a further saving is had in the longer life of the calcination chambers.

In carrying out the process I subject limestone, comminuted so as to pass at least an 8-mesh sieve, and preferably finer, to the action of externally applied heat at a temperature of approximately 700° C. in the presence of an atmosphere of steam, the comminuted limestone being agitated during the continuance of the process.

The calcination chamber, whether of the stationary batch type or of the rotary cylinder type, is provided with means for the admission of steam into the chamber and with an exit for the carbon dioxide ($CO_2$). The steam acts first to take the place of and thereafter to exclude air in the calcination chamber while the charge is being brought to a temperature of 700° C., the amount of steam requisite for such displacement of air being only that required to maintain a slight pressure and minimum velocity of movement through the chamber to carry off the carbon dioxide. By reason of this very slow movement of the steam there is constantly maintained an atmosphere of steam in the calcination chamber. In order that the process may proceed with the highest efficiency it is essential that the steam be introduced into the chamber during vigorous agitation of the comminuted limestone. The determined capacity of the steam atmosphere to effect a decrease in the temperature of calcination to 700° C. is a catalytic function peculiar to the steam and such inherent catalytic capacity has not been demonstrated for other gases. The calcination chamber should be provided with a suitable exit opening or duct at the end opposite to the one where the steam enters. Such duct may be provided with means to occlude a small amount of dust that may accompany the gaseous discharge so that when the effluent gases are allowed to cool to the condensation temperature of steam the result is substantially pure carbon dioxide ($CO_2$).

Preferably I conduct the process by means of any suitable rotating calcining chamber into which the raw and admissibly wet comminuted limestone is introduced at one end, somewhat removed from the zone of high temperature, 700° C. By so doing the raw material is preheated before its entrance in the zone of critical temperature. The heat is externally applied and may be applied in any of the usual ways of effecting indirect application of heat.

I have found that by comminuting limestone so that it will all pass through an 8-mesh sieve and subjecting the same simultaneously to the action of heat at a temperature of 700° C., in the presence of an atmosphere of steam and during agitation, a substantially complete dissociation of the CaO and $CO_2$ is effected, whereas if the same temperature be applied in an atmosphere of air, even though the limestone be comminuted to pass an 8-mesh sieve, such dissociation is not obtained. I have also found that the finer the limestone is comminuted the more rapid is the calcination and except for a larger dust migration I prefer limestone much finer than 8-mesh.

Furthermore, if the limestone is so comminuted to pass a half inch or quarter inch but is stopped on an 8-mesh sieve the dissociation of the limestone is but partially complete within an economic period of calcination even though it be subjected to a temperature of 700° C. in an atmosphere of steam. And, furthermore, even though all the limestone be comminuted fine enough to all pass through an 8-mesh or even a 100-mesh sieve and subjected to a temperature of anything materially less than 700° C.—say 650° C.—the dissociation of CaO and $CO_2$ is ineffective and incomplete. Whereas, if the limestone all pass through a 100-mesh sieve the dissociation is practically complete at a temperature of 700° C., in an atmosphere of steam. The requisites of the invention therefore are that the limestone shall be comminuted so as to pass an 8-mesh sieve; that this finely comminuted limestone be subjected to a temperature of approximately 700° C., in an atmosphere of steam during continuous agitation. When this specific process is followed from 51 to 56% (all) of the limestone will be converted into CaO with a residual $CO_2$ content of from 2½% to nil.

As pointed out above, the pressure of steam in the calcination chamber should be only sufficient to cause a movement from the chamber of the $CO_2$ gas given off, thereby preserving in the chamber a constant atmosphere of steam.

It will be seen that by reason of the lower degree of temperature employed (some 210° C. below that heretofore deemed critical and 400° C. below that employed in the art) that the heat costs will be materially lowered and that the destructive action of heat upon the calcination chamber is materially reduced. The heat necessary for the production of the steam employed can very largely be that of waste heat from the calcination furnace or other source.

Having thus described the invention, what is claimed is:

In a process for producing calcium oxide from limestone the steps of first comminuting the limestone to minus 8-mesh, subjecting the limestone to agitation in a calcining chamber at a temperature of approximately 700° C., excluding air from the calcining chamber, maintaining a complete atmosphere of steam in said calcining chamber until the $CO_2$ component of the limestone is substantially completely dissociated from the CaO component.

WALTER H. MacINTIRE.